US011835163B2

United States Patent
Roa-Quispe et al.

(10) Patent No.: US 11,835,163 B2
(45) Date of Patent: Dec. 5, 2023

(54) STRAIN RELIEF ASSEMBLY

(71) Applicant: Belden Canada ULC, Saint-Laurent (CA)

(72) Inventors: Christian Roa-Quispe, Laval (CA); Oscar Alberto Lazarte Barrios, Saint-Laurent (CA)

(73) Assignee: BELDEN CANADA ULC, Saint-Laurent (CA)

( * ) Notice: Subject to any disclaimer, the term of this patent is extended or adjusted under 35 U.S.C. 154(b) by 0 days.

(21) Appl. No.: 17/650,829

(22) Filed: Feb. 11, 2022

(65) Prior Publication Data
US 2022/0260182 A1 Aug. 18, 2022

Related U.S. Application Data

(60) Provisional application No. 63/200,081, filed on Feb. 12, 2021.

(51) Int. Cl.
*F16L 3/01* (2006.01)

(52) U.S. Cl.
CPC ...................... *F16L 3/01* (2013.01)

(58) Field of Classification Search
CPC ........... F16L 3/01; H02G 3/0437; H02G 3/32; H02G 3/263
USPC .................................................. 248/65, 68.1
See application file for complete search history.

(56) References Cited

U.S. PATENT DOCUMENTS

| | | | |
|---|---|---|---|
| 3,991,960 A | 11/1976 | Tanaka | |
| 5,765,786 A * | 6/1998 | Gretz | H02G 3/26 248/68.1 |
| 6,170,784 B1 | 1/2001 | MacDonald et al. | |
| 6,629,675 B1 | 10/2003 | Bjorklund et al. | |
| 6,702,237 B2 | 3/2004 | Rubenstein et al. | |
| 7,027,706 B2 | 4/2006 | Diaz et al. | |
| 7,200,316 B2 | 4/2007 | Giraud et al. | |
| 7,345,241 B2 | 3/2008 | Caveney et al. | |
| 7,734,139 B2 | 6/2010 | Rector, III | |
| 8,464,984 B2 | 6/2013 | Laursen | |
| 2017/0002958 A1 * | 1/2017 | Harnetiaux | B60R 16/0215 |
| 2018/0031794 A1 * | 2/2018 | Sakmar | G02B 6/48 |
| 2020/0028343 A1 * | 1/2020 | Ciesielczyk | H02G 3/0437 |
| 2020/0403390 A1 * | 12/2020 | Jette | H02S 40/30 |
| 2021/0285571 A1 * | 9/2021 | Taillon | F16L 3/1222 |

FOREIGN PATENT DOCUMENTS

WO 2018047099 A1 3/2018

* cited by examiner

*Primary Examiner* — Muhammad Ijaz
(74) *Attorney, Agent, or Firm* — Lavery, de Billy, L.L.P.; Hugh Mansfield

(57) ABSTRACT

A strain relief assembly is disclosed comprising a support for mounting on a tray or the like and an elongate support member to which is rotatably mounted a strain relief member. The strain relief member is secured to the support member by a securing mechanism comprising a shaft which travels within a shaft receiving bore between a secured position, wherein a first shaft end of the shaft presses against a free end of the second portion and thereby preventing rotation of the elongate strain relief member and a released position wherein the shaft is positioned away from the free end of the second portion and such that the elongate strain relief member is rotatable.

20 Claims, 5 Drawing Sheets

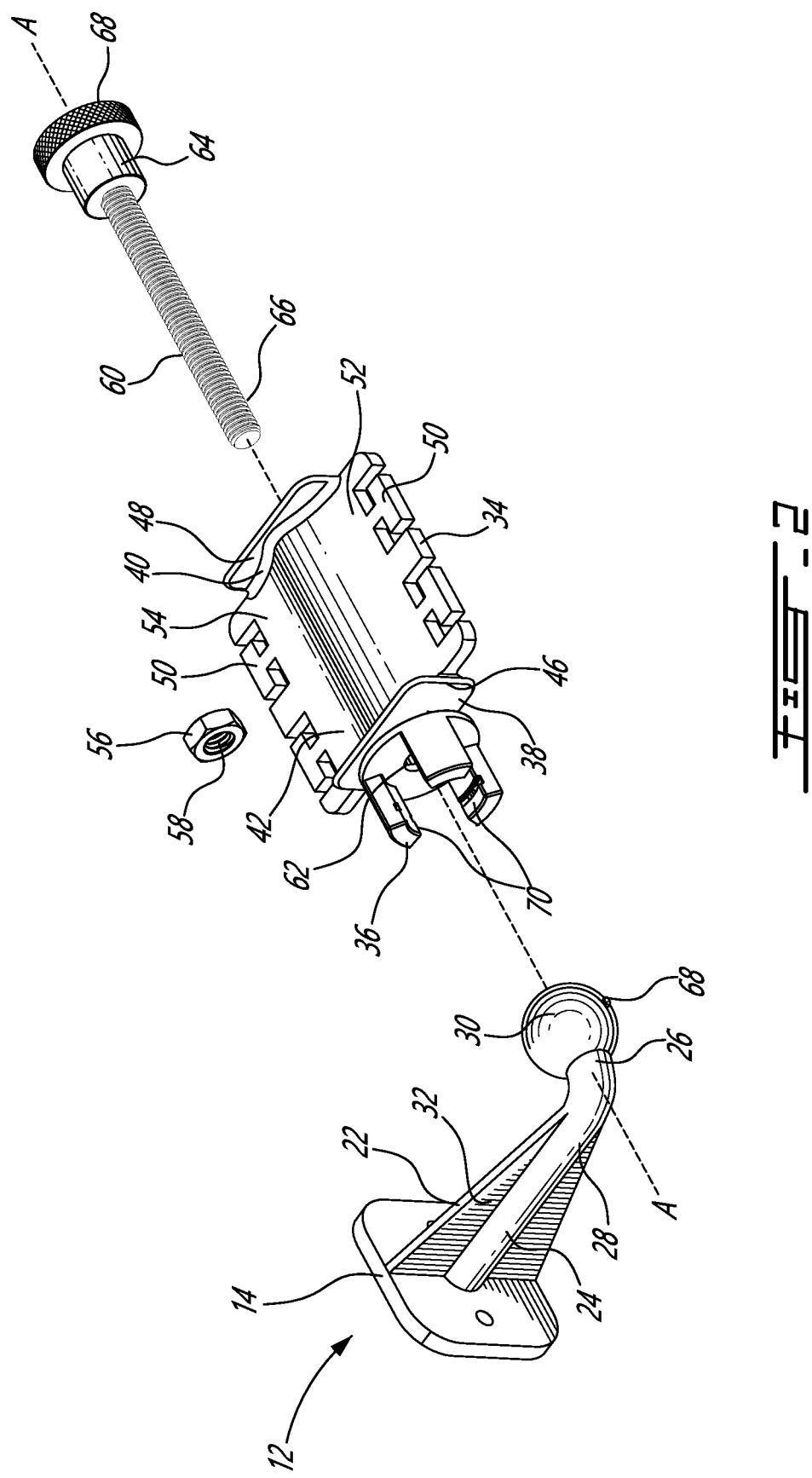

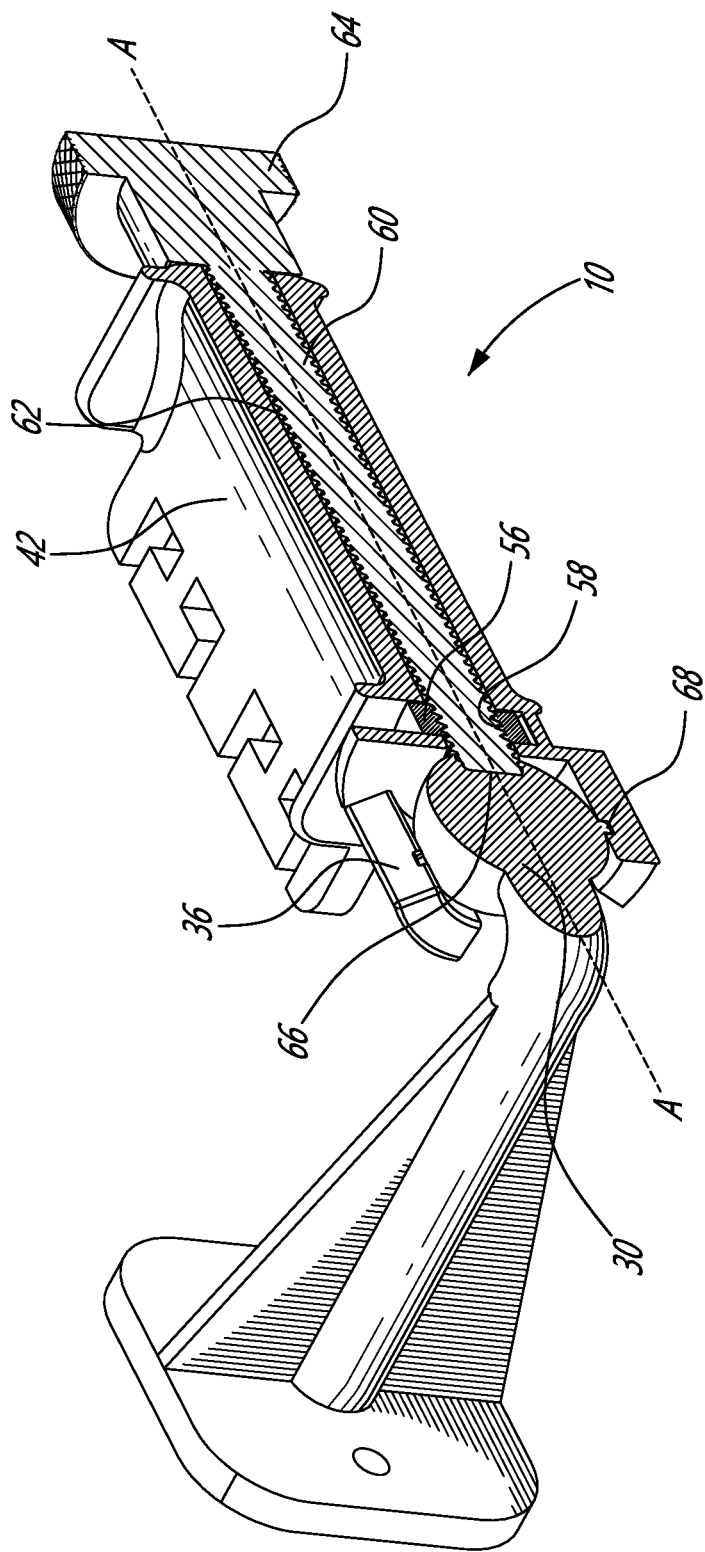

STRAIN RELIEF ASSEMBLY

CROSS REFERENCE TO RELATED APPLICATIONS

This application claims benefit, under 35 U.S.C. § 119(e) of U.S. provisional application Ser. No. 63/200,081 filed on Feb. 12, 2021 and which is incorporated herein in its entirety by reference.

FIELD OF THE INVENTION

The present invention relates to a strain relief assembly. In particular, the present invention relates to an adjustable strain relief assembly mountable to a tray.

SUMMARY OF THE INVENTION

There is provided a strain relief assembly comprising a support comprising a base and an elongate support member comprising a first portion attached to and extending away from the base and a second portion extending away from an end of the first portion at an angle to the first portion, an elongate strain relief member attached to a free end of the second portion for rotation about an axis, the elongate strain relief member comprising an elongate cable receiving part arranged along the axis and comprising a first end and a second end opposite the first end, the elongate cable receiving part further comprising at least one cable receiving surface and a shaft receiving bore concentric with the axis and extending a length of the cable receiving part, and a securing mechanism comprising a shaft arranged for travel within the shaft receiving bore between a secured position, wherein a first shaft end of the shaft presses against the free end of the second portion thereby preventing rotation of the elongate strain relief member about the axis and a released position wherein the shaft is positioned away from the free end of the second portion and such that the elongate strain relief member is rotatable about the axis.

BRIEF DESCRIPTION OF THE DRAWINGS

FIG. 2 provides a raised exploded perspective view of strain relief assembly in accordance with an illustrative embodiment of the present invention;

FIG. 3 provides a sectional view along III-III in FIG. 1;

DETAILED DESCRIPTION OF THE ILLUSTRATIVE EMBODIMENTS

Figure 1:
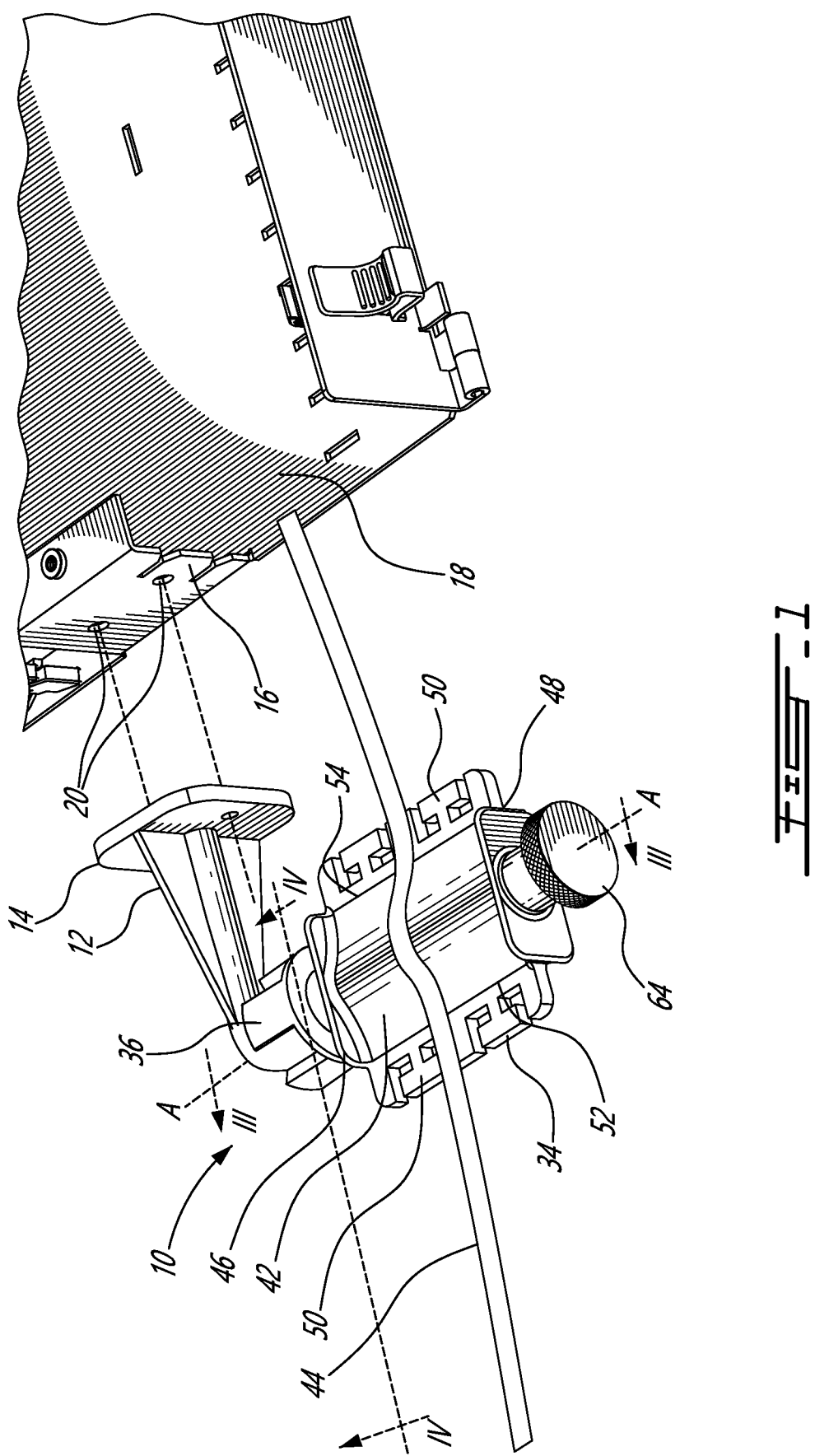
FIG. 1 provides a raised perspective view of a strain relief assembly and tray in accordance with an illustrative embodiment of the present invention.

Referring now to FIG. 1, a strain relief assembly, generally referred to using the reference numeral 10, will now be described. The assembly 10 comprise a support 12 comprising a flat base 14 configured for attachment to a flat surface, such as the side 16 of a tray 18 or the like. In this regard, the flat base 14 can be secured to the side 16 using bolts or the like (not shown) which are engaged in complementary threaded bores 20 machined or otherwise formed in the side 16.

With reference now to FIG. 2 in addition to FIG. 1, the support 12 further comprises an elongate support member 22 comprising a rod-like first portion 24 attached to the base 14 and extending away therefrom in a direction which is substantially normal to the base 14 and a second portion 26 arranged at a right angle to the first portion 24 and interconnecting an outer end 28 of the first portion with a spherical ball 30. In a particular embodiment the second portion 26 is curved about 90 degrees between the outer end 28 and the ball 30. Re-enforcing abutments 32 are provided to stabilise the support member 22.

Still referring to FIG. 2 in addition to FIG. 1, the strain relief assembly 10 further comprises an elongate strain relief member 34 comprising a socket 36 at a first end 38 and configured for receiving the ball 30 in a ball and socket relationship and for limited rotation about an axis A-A. The strain relief member 34 further comprises an elongate cable receiving part 40 arranged along the axis A-A. The cable receiving part 40 further comprises a pair of cable receiving surfaces 42 of like shape and opposite one another on either side of the axis A-A for receiving cables 44 thereon. In order to retain the cables 44 on the surfaces 42 first and second collars 46, 48 are provided at respective ends of the cable receiving part 40. Similarly, cable securing features 50 are provided along a length of the outer long edges 52, 54 of the cable receiving part 40. In this regard the cable securing features 50 provide convenient locations for securing cable ties or the like (not shown).

Referring now to FIG. 3 in addition to FIGS. 1 and 2, in order to releasably secure the ball 30 and socket 36 in a fixed relationship a securing mechanism is provided comprising a bolt 56 embedded in the cable receiving part 40. The bolt 56 comprises a threaded inner surface 58 arranged concentric with the axis A-A which engages a threaded shaft 60. The shaft 60 is held for rotation within a shaft receiving bore 62 arranged concentric with the axis A-A and further comprises a user actuatable knob 64. As a person of skill in the art will now understand, depending on the direction the knob 64 is turned, an end 66 of the shaft 60 may be selectively moved towards or away from the ball 30 held within the socket 36. Moving the shaft 60 towards the ball 30 causes the end 66 to engage the ball 30 thereby releasably secures the ball 30 in a fixed relationship to the socket 36.

Figure 4A:
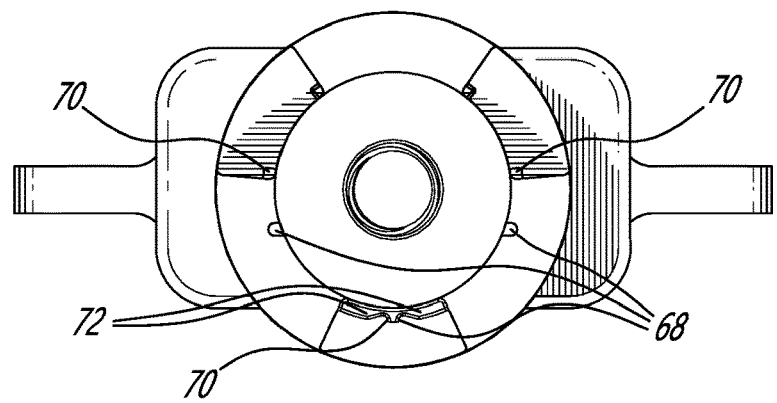
FIGS. 4A through 4C provide sectional views along IV-IV in FIG. 1.
Figure 4B:
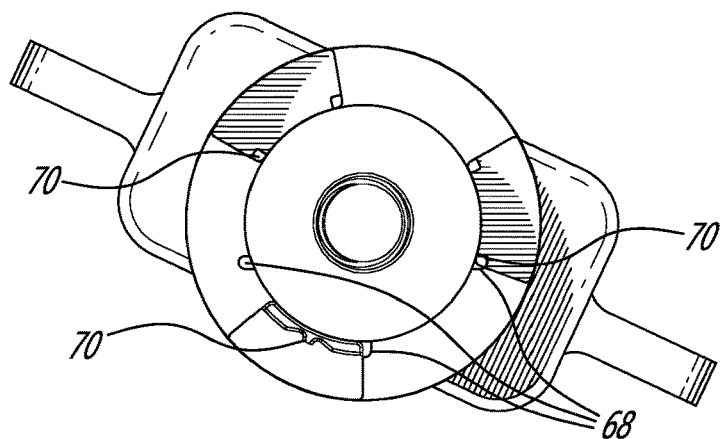
Figure 4C:
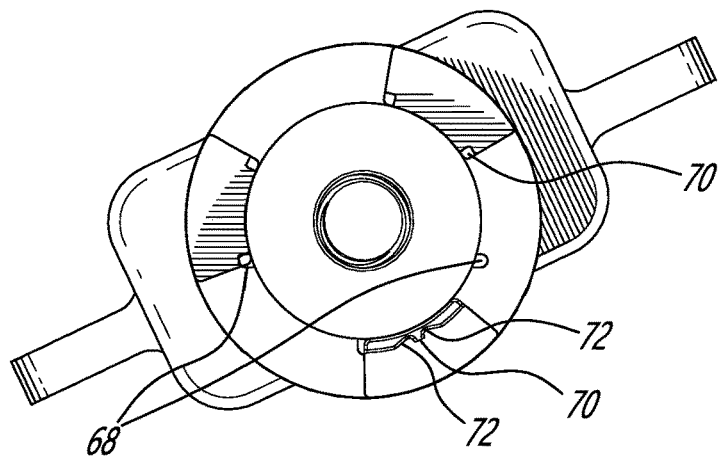

Referring to FIG. 4A in addition to FIGS. 2 and 3, releasing the engagement between the support 12 and the cable receiving part 40 by rotating the knob 64 allows the cable receiving part 40 to be rotated relative to the support 12. In this regard, the ball 30 comprises bosses 68 which engage with features 70 on the socket 36 in order to limit rotation of the cable receiving part 40 to the support 12 to within predetermined limits. In an intermediate position as shown in FIG. 4A a middle one of the bosses 68 is received within the lower feature 70. In this regard the lower feature 70 comprises bevelled walls 72 such that the boss 68 can be moved in to and out of the feature 70 while providing tactile feedback.

Figure 5C:
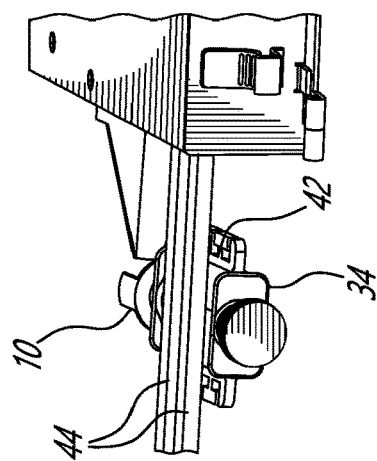
FIGS. 5A through 5C provide front perspective views of a strain relief assembly and tray receiving cables from different orientations and in accordance with an illustrative embodiment of the present invention.
Figure 5B:
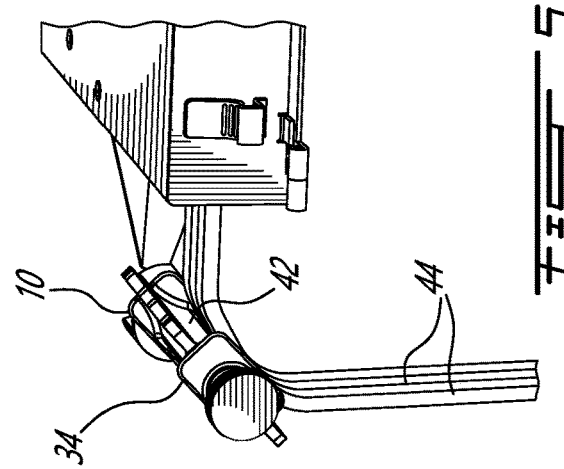
Figure 5A:
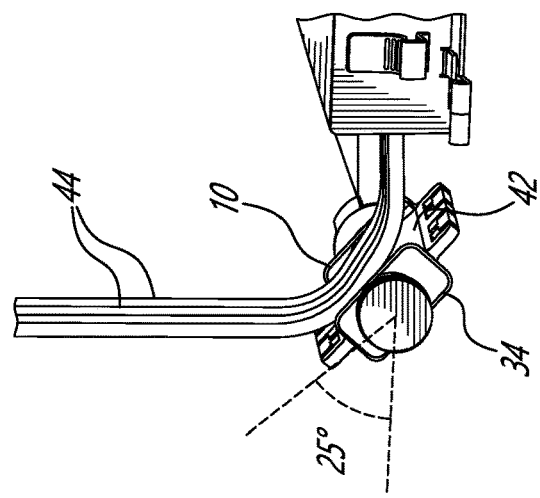

Referring to FIGS. 5A through 5C, illustratively the bosses 68 and features 70 are positioned such that the strain relief member 34 can be rotated through 50° and the cable receiving surfaces 42 positioned at up to ±25° from the horizontal. This allows cables 44 to be conveniently received and secured from above (FIG. 5A), below (FIG. 5B) and the side (FIG. 5C) as well as intermediate positions.

Although the present invention has been described hereinabove by way of specific embodiments thereof, it can be modified, without departing from the spirit and nature of the subject invention as defined in the appended claims.

The invention claimed is:

1. A strain relief assembly, comprising:
a support comprising a base and an elongate support member comprising a first portion attached to and extending away from the base and a second portion extending away from an end the first portion at an angle to the first portion;
an elongate strain relief member attached to a free end of the second portion for rotation about an axis, the elongate strain relief member comprising a cable receiving part arranged along the axis and comprising a first end and a second end opposite the first end, the elongate cable receiving part further comprising at least one cable receiving surface and a shaft receiving bore concentric with the axis and extending a length of the cable receiving part; and
a securing mechanism comprising a shaft arranged for travel within the shaft receiving bore between a secured position, wherein a first shaft end of the shaft presses against the free end of the second portion thereby preventing rotation of the elongate strain relief member about the axis and a released position wherein the shaft is positioned away from the free end of the second portion and such that the elongate strain relief member is rotatable about the axis.

2. The strain relief assembly of claim 1, wherein the elongate strain relief member is rotatable between a first angled orientation and a second angled orientation through a horizontal orientation.

3. The strain relief assembly of claim 2, wherein an angle between the first angled orientation and the second angled orientation is less than or equal to 50 degrees.

4. The strain relief assembly of claim 2, wherein a mechanical feedback is provided as the elongate strain relief member is rotated into the horizontal orientation.

5. The strain relief assembly of claim 4, wherein the mechanical feedback is provided by a boss on the free end of the second portion which is engaged in a feature on the elongate strain relief member the elongate strain relief member is rotated into the horizontal orientation.

6. The strain relief assembly of claim 5, wherein the first cable receiving surface and the second cable receiving surface are like surfaces and arranged opposite one another about the axis.

7. The strain relief assembly of claim 1, wherein the elongate cable receiving part further comprises a pair of long outer edges arranged opposite one another on either side of and in parallel to the axis, each the outer edges comprising at least one cable securing feature along a length thereof.

8. The strain relief assembly of claim 1, further comprising a nut comprising a threaded inner surface imbedded in the elongate strain relief member concentric with the axis, wherein a second shaft end extends beyond the elongate strain relief member and comprising a knob attached to the second shaft for rotating the shaft about the axis, wherein a complementary threaded portion of the shaft is engaged by the threaded inner surface of the nut and such that through rotation of the shaft using the knob, a threaded outer surface is engaged by the threaded inner surface thereby moving the first shaft end along the axis between the secured position and the released position.

9. The strain relief assembly of claim 8, wherein the first collar and the second collar are arranged concentric with the axis.

10. The strain relief assembly of claim 1, wherein the free end of the second portion comprises a ball and the elongate strain relief member further comprises a socket concentric with the axis for receiving the ball.

11. The strain relief assembly of claim 10, further comprising a first collar between the socket and the cable receiving part and a second collar at a second end of the cable receiving part opposite the first end, the first collar and the second collar extending above at least one cable receiving surface.

12. The strain relief assembly of claim 1, wherein the base is flat and configured for attachment to a flat surface.

13. The strain relief assembly of claim 1, wherein the first portion extends away from the base in a direction substantially normal to the base.

14. The strain relief assembly of claim 1, wherein the second portion is arranged at a right angle to the first portion.

15. The strain relief assembly of claim 1, wherein the at least one cable receiving surface comprises a first cable receiving surface and a second cable receiving surface on an opposite side of the axis to the first cable receiving surface.

16. A strain relief assembly, comprising:
a support;
a strain relief member;
a securing mechanism;
wherein the support comprises a base and an elongate support member;
wherein the elongate support member comprises a first portion attached the base;
wherein the elongate support member extends away from the base;
wherein the elongate support member comprises a second portion extending away from an end of the first portion at an angle to the first portion;
wherein the strain relief member is elongate;
wherein the strain relief member is attached to a free end of the second portion;
wherein the strain relief member is configured for rotation about an axis;
wherein the strain relief member comprises an elongate cable receiving part arranged along the axis;
wherein the elongate cable receiving part comprises a first end and a second end opposite the first end;
wherein the elongate cable receiving part comprises at least one cable receiving surface;
wherein the elongate strain relief member is configured such that when secured by the securing mechanism rotation of the elongate strain relief member about the axis is prevented.

17. The strain relief assembly of claim 16, wherein the elongate cable receiving part further comprises a shaft receiving bore concentric with the axis and extending a length of the cable receiving part and wherein the securing mechanism comprises a shaft configured for travel within the shaft receiving bore between a secured position and a released position, wherein in the secured position a first shaft end of the shaft presses against the free end of the second portion thereby preventing rotation of the elongate strain relief member about the axis, and wherein in the released position the shaft is positioned away from the free end of the second portion and such that the elongate strain relief member is rotatable about the axis.

18. A strain relief assembly, comprising:
a support;

a strain relief member;

a securing mechanism;

wherein the support comprises a base and an elongate support member;

wherein the elongate support member comprises a first portion attached the base;

wherein the elongate support member extends away from the base;

wherein the elongate support member comprises a second portion extending away from an end of the first portion at an angle to the first portion;

wherein the strain relief member is elongate;

wherein the strain relief member is attached to a free end of the second portion;

wherein the strain relief member is configured for rotation about an axis;

wherein the strain relief member comprises an elongate cable receiving part arranged along the axis;

wherein the elongate cable receiving part comprises a first end and a second end opposite the first end;

wherein the elongate cable receiving part comprises at least one cable receiving surface;

wherein the elongate cable receiving part concentric with the axis and extending a length of the elongate cable receiving part;

wherein the securing mechanism comprises a shaft configured for travel within the shaft receiving bore between a secured position and a released position;

wherein in the secured position a first shaft end of the shaft presses against the free end of the second portion thereby preventing rotation of the elongate strain relief member about the axis; and wherein in the released position the shaft is positioned away from the free end of the second portion and such that the elongate strain relief member is rotatable about the axis.

19. The strain relief assembly of claim 18, wherein a mechanical feedback is provided as the elongate strain relief member is rotated into a horizontal orientation.

20. The strain relief assembly of claim 18, wherein the elongate strain relief member is rotatable about the axis between a first angled orientation and a second angled orientation through a horizontal orientation.

* * * * *